United States Patent [19]

Shoshan et al.

[11] Patent Number: 5,058,117
[45] Date of Patent: Oct. 15, 1991

[54] RAMAN SHIFTING DEVICE

[76] Inventors: Itamar Shoshan, 29 Argaman Street, Ramat-Efal, Israel; Gad Ravnitzki, Beit Oved, Israel

[21] Appl. No.: 405,192

[22] Filed: Sep. 11, 1989

[30] Foreign Application Priority Data

Apr. 19, 1989 [IL] Israel ............................... 90034

[51] Int. Cl.$^5$ ............................... H01S 3/30
[52] U.S. Cl. ............................... 372/3; 359/327
[58] Field of Search ............................... 372/3; 307/426

[56] References Cited

U.S. PATENT DOCUMENTS

| | | | |
|---|---|---|---|
| 4,618,783 | 10/1986 | Pradere et al. | 372/3 |
| 4,628,513 | 12/1986 | White | 372/3 |
| 4,633,103 | 12/1986 | Hyman et al. | 372/3 |
| 4,685,107 | 8/1987 | Kafka et al. | 372/3 |
| 4,751,714 | 6/1988 | Chen | 372/3 |
| 4,829,528 | 5/1989 | Band et al. | 372/3 |

Primary Examiner—William L. Sikes
Assistant Examiner—Robert E. Wise
Attorney, Agent, or Firm—Fleit, Jacobson, Cohn, Price, Holman & Stern

[57] ABSTRACT

The invention relates to a Raman converter of improved design, which does not require an exact alignment of the optical elements. There is provided is backward Raman converter which comprises a Raman medium which converts a laser radiation of a given wavelength to a different wavelength by Raman scattering, which comprises a dichroic coupler positioned between a pump laser at the one side of the Raman medium, directing the laser beam into the Raman medium, reflective means being positioned on the second side of the Raman medium, which reflects the Raman-shifted radiation back into the Raman medium, wherein the radiation is amplified by the interaction with the Raman medium and with the incoming pump laser beam. The amplified Raman shifted beam is coupled out of the system by means of the dichroic coupler.

19 Claims, 2 Drawing Sheets

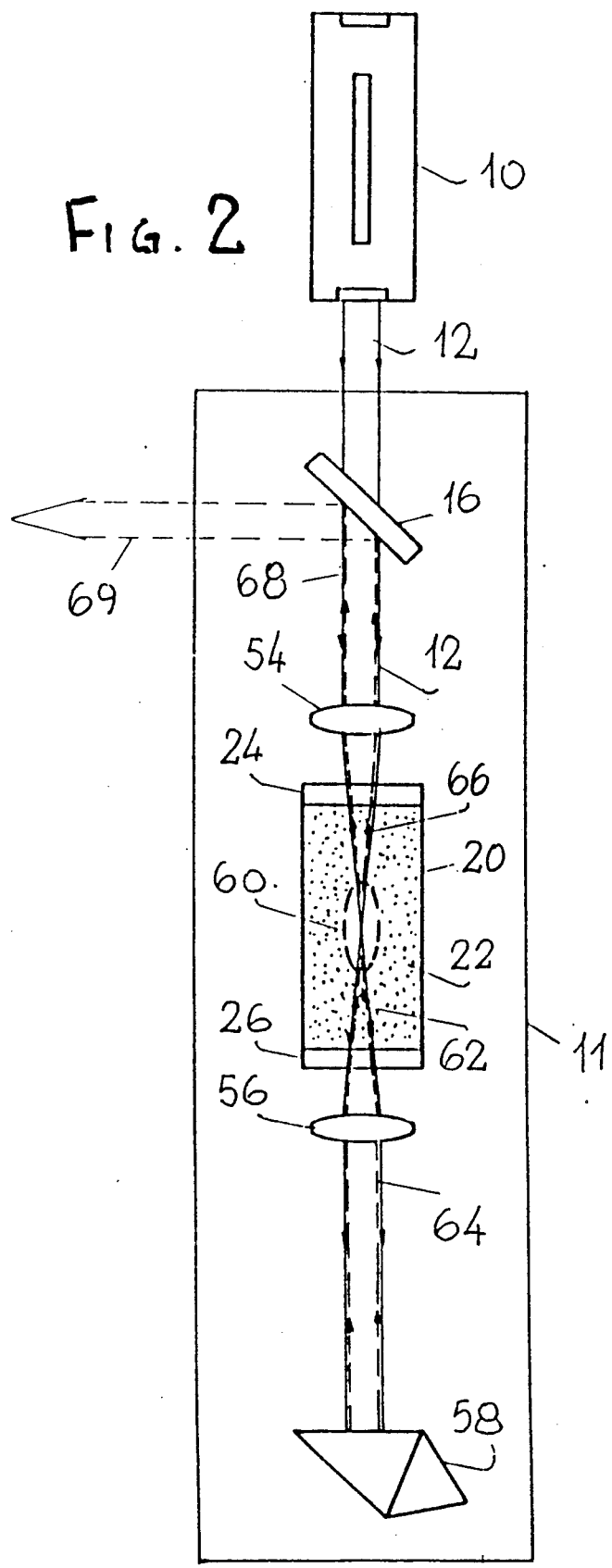

RAMAN SHIFTING DEVICE

This invention relates to Raman Converters and to Raman Laser Systems comprising such converters.

BACKGROUND

Raman shifting devices include a Raman scattering medium, usually a high pressure gas cell. In such devices laser radiation at a given wavelength is converted to a radiation which has a longer wavelength by a process of Stimulated Raman scattering. This longer wavelength radiation is termed stokes Radiation or Raman-shifted Radiation. The scattering medium is chosen for conversion of the laser radiation to the desired wavelength. By using methane which has a frequency shift of 2916 cm$^{-1}$ it is possible to convert the 1.06 micron radiation of the Neodymium:YAG laser to 1.54 micron which is an "eyesafe" wavelength.

Several conversion schemes are known in the prior art. For example in U.S. Pat. No. 3,668,420 issued to Vanderslice in 1972, the Raman converter used includes two mirrors which form a resonator for the shifted wavelength. In European Patent No. 63205, Bess and Ruger (1985), a single mirror is used to form a "semi resonator". A more comprehensive description is given by Parazzoli et al in IEEE Journal of Quantum Electronics Vol. 24 (1988) p. 872. In both of these designs the mirrors used must be aligned with respect to the pump source radiation in order to reflect the wavelength-shifted radiation to the region in which the pump source radiation is focused. This alignment is critical for the suppression of the competing process of stimulated Brillouin scattering and must be precisely maintained thereby complicating the mechanical construction of the converter.

In an attempt to overcome this drawback, Bruesselbach and Whirst described in their international patent application WO 86/02784 a design in which the mirror of the Raman semi-resonator is also the output mirror of the laser source. This design does not guarantee however an automatic alignment of the Raman converter since the laser beam may deviate from the normal to the output mirror as a result of thermal effects in the active medium or in the Q-switching material or due to misalignment of the laser mirrors.

SUMMARY OF THE INVENTION

It is an object of this invention to overcome the above mentioned drawbacks and to provide a simple Raman converter which does not need precise alignment of optical elements.

These advantages are realized according to the present invention by using a backward Raman converter for Raman-shifting the beam of a pump laser. This backward Raman converter includes a Raman medium in which the pump laser beam interacts with a Raman medium to generate Raman-shifted radiation, a dichroic coupler positioned between said pump laser and one side of said Raman medium for directing said pump laser beam to said Raman medium, and reflection means positioned on the other side of said Raman medium for reflecting said Raman-shifted radiation back into said Raman cell where it is amplified by interacting with said Raman medium and the incoming pump laser beam. The amplified Raman-shifted beam is coupled out of the system by said dichroic coupler.

BRIEF DESCRIPTION OF THE DRAWINGS

FIG. 2 is a schematic illustration of a preferred embodiment of a Raman converter according to the present invention.

DETAILED DESCRIPTION OF THE INVENTION

Figure 1:
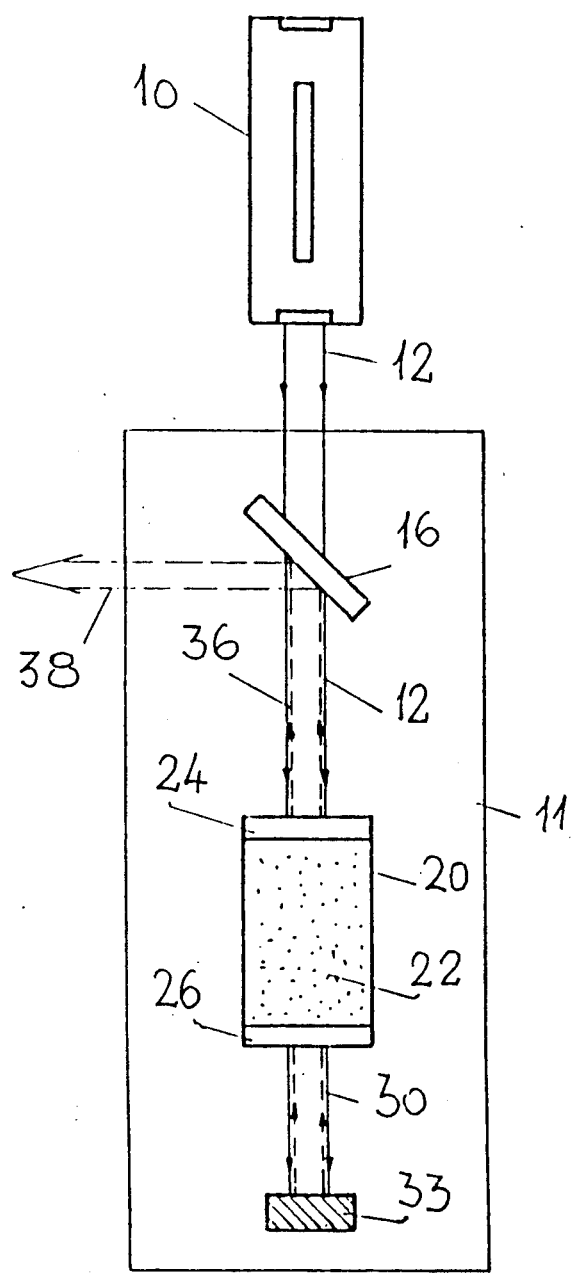
FIG. 1 is a schematic illustration of a Raman converter according to the present invention.

The following description, which refers to certain types of lasers, etc., is by way of illustration only and ought to be construed in a non-limitative manner.

A more detailed description of the invention will be given now with reference to FIG. 1. A Raman converter 11 of the invention is illustrated in operation with a pump laser 10, which is a Neodymium:YAG laser producing a pump laser beam 12 at a wavelength of 1.06 micron. The dichroic coupler 16 consists of a glass plate with a dichroic dielectric coating transmitting the pump laser beam 12 and reflecting the beam at the Raman-shifted wavelength of 1.54 micron.

Raman cell 20 is a container with windows 24 and 26, containing methane gas 22 at a high pressure. Within said Raman cell 20, the pump laser beam interacts with molecules of the methane gas 22 to produce by stimulated Raman scattering Raman-shifted radiation 30 at a wavelength of 1.54 micron, which is reflected by reflector 33 back to the Raman cell 20 where it is amplified by backward stimulated Raman scattering of the incoming pump laser beam 12. The amplified Raman-shifted beam 36 is reflected by the dichroic coupler 16 as Raman-shifted output beam 38.

In this Raman converter the conversion is essentially performed by backward Raman scattering within the gas 22, this scattering being enhanced by a feedback of the forward scattered Raman-shifted radiation 30. This converter may be also interpreted as a kind of "semi-resonator" converter, as only a single reflector is used for feedback of the Raman-shifted radiation. A preferred embodiment of the invention comprises a retroreflector as reflecting means rendering the converter insensitive to possible tilting of the reflecting means or to possible wandering of the pump beam. In this way the mechanical construction of the converter is simplified.

FIG. 2 illustrates a preferred embodiment of the invention. It is known that for a good conversion efficiency in a compact Raman shifting device it is necessary to focus the pump laser beam within the Raman cell to produce there the high power density needed for efficient Raman interactions. This is attained in the Raman converter of the present invention by focusing means comprising a pair of lenses 54 and 56 positioned one on each side of the Raman cell 20. Alternatively, lenses 54 and 56 may respectively replace the windows 24 and 26 of the Raman cell 20. The reflecting means is a corner reflector 58 consisting a glass prism with three mutually perpendicular faces. Three total internal reflections of the incident beam at these faces result in retro-reflection of that beam. An alternative to this type of retro-reflector is the hollow retro-reflector consisting of three mirrors mounted perpendicular to each other. In operation, the pump laser beam 12 transmitted through the dichroic coupler 16 is focused by lens 54 to a focal region 60 within the Raman cell 20 to produce there a high power density of the order of several Gigawatts per square centimeter for an efficient Raman interaction to take place. It is in this focal region 60 that the Raman-shifted radiation 62 is generated. This radiation diverges and is collimated by the lens 56 to collimated beam 64 that is reflected backwards by corner reflector 58, and after such reflection, is focused by lens 56 to the focal region 60 where it is amplified by backward stimulated Raman scattering of the pump laser beam 12. The amplified Raman-shifted beam 66 diverges and is collimated by lens 54 to collimated beam 68 which is reflected by the dichroic coupler 16 resulting in Raman-shifted output beam 69.

In operation, even a weak reflected Raman-shifted radiation 62 is sufficient to enhance backward Raman scattering in the focal region. As a result, most of the Raman scattering is in the backward direction. In this way the pump laser beam 12 is attenuated before reaching the focal point, thereby enabling operation of the converter at higher energies before the occurrence of electrical breakdown in the focal region 60. For some applications this may be a significant advantage compared with the prior art designs.

The advantage of using a corner reflector as reflecting means is that it does not need exact alignment and irrespective of its orientation it reflects the collimated beam 64 back on itself so that it is focused exactly to the focal region 60 for an additional interaction. As was verified experimentally this insensitivity to misalignment results in a significant improvement in the energy stability of the Raman shifted output beam. According to the invention, reflecting means such as a mirror, a porro prism or other types of roof reflectors known in the art can be used.

Additional improvements can be applied to the Raman converter:

As is well known, the efficiency of Raman-shifting devices depends strongly on the competition between the Raman scattering and the Brillouin scattering processes. Depending on the type of Raman medium used and on the wavelength of the pump laser, it may be sometimes advantageous to add between the Raman cell 20 and reflecting means 33 in FIG. 1 a filter that removes the remaining radiation at the pump wavelength thereby preventing its back reflection to the focal region 60. Such a feedback at the pump wavelength is undesirable since it may enhance the Stimulated Brillouin scattering thereby reducing the Raman conversion efficiency. Such an undesirable feedback at the pump wavelength can be prevented by using a suitable absorber, or by a reflective filter or by the use of dispersive elements such as a grating or prism. If a reflective filter is positioned between Raman cell 20 and reflecting means 33 in FIG. 1, the reflection at the pump wavelength can be utilized as a secondary output beam thereby providing a dual wavelength laser system. Another solution can be provided by using as reflecting means 33 a reflector which selectively reflects the stokes shifted radiation at 1.54 micron but not the radiation at 1.06 micron.

In another modification of the preferred embodiment, a phase conjugating reflector is used as the reflecting means 58 in FIG. 2. Like the corner reflector, the phase conjugating reflector provides retro-reflection of the Raman shifted radiation 62. Its advantage is that, due to a reversal of the radiation wavefront, any wavefront deformation induced by the first passage of the Raman shifted radiation through the focal region 60 within the Raman medium, is cancelled after a second pass along the same path. In this way an undistorted output beam is obtained even in cases where the Raman medium induces optical distortions due to its heating for example. Various types of phase-conjugating reflectors are known in the prior art. In such devices a phase-conjugated beam is produced by a nonlinear optical interaction of the incident beam with the phase-conjugating material. Stimulated Brillouin scattering (SBS) is one of the nonlinear interactions known in the prior art to produce phase conjugation of laser beams. This type of phase conjugation can be easily combined with the converter described in FIG. 2. This can be done for example by replacing window 26 with a short focus concave mirror which focuses the Raman-shifted radiation 62 into a small focal point within the gas from which stimulated Brillouin backscattering provides the phase-conjugate reflection.

A Raman converter was built in accordance with FIG. 2. The pump laser used was a Q-switched Nd:YAG laser producing 120 milliJoules per pulse of 16 nsec of 1.06 micron radiation. Using high pressure methane as the Raman medium, a corner reflector as the reflecting means and a dichroic mirror as the dichroic coupler, a Raman shifted output beam was generated with 40 milliJoules per pulse.

One embodiment of the invention provides a Raman converter that is insensitive to optical misalignment or to wandering of the pump laser beam. It should be understood that the invention is not limited to the embodiments described herein but that various modifications and changes in the nature and arrangement of parts can be resorted to without departing from the scope and spirit of the invention.

We claim:

1. A Raman converter for converting a laser beam, at a first wavelength, generated in a separate laser module, into a Raman-shifted beam at a second wavelength, said Raman converter being external to said laser module and comprising a sequence of a dichroic coupler, a Raman medium and reflection means positioned, optically aligned after the laser module, so that the laser beam passes first through the dichroic coupler directing beams into said Raman medium, thus scattering Raman shifted radiation in a forward and a backward direction, said reflecting means returning the forward scattered radiation to the Raman medium, thus increasing the intensity of the backward scattered Raman-shifted radiation, which is coupled out by the dichroic coupler.

2. A Raman converter according to claim 1, wherein the reflection means are retro-reflecting means.

3. A Raman converter according to claim 2 wherein said retro-reflecting means is a corner-reflector.

4. A Raman converter according to claim 1 wherein said reflection means is a phase-conjugating reflector.

5. A Raman converter according to claim 1, wherein focusing means are provided for focusing the laser radiation to a focal region within said Raman medium, optical means being disposed between said Raman medium and said reflection means for collimation of Raman-shifted radiation scattered from said focal region to a collimated beam and for focusing said collimated beam after its reflection by said reflection means to said focal region.

6. A Raman converter according to claim 5 wherein the optical means and the focusing means are lenses, or lens systems, disposed one at each side of said Raman medium.

7. A Raman converter according to claim 1 wherein said Raman Medium is a gas suitable for Raman scattering.

8. A Raman converter according to claim 7 wherein said first wavelength is about 1.06 micron and said second wavelength is about 1.54 micron, and said gas is methane.

9. A Raman converter according to claim 1 wherein a filter is provided between said Raman medium and said reflection means to avoid return of laser radiation at said first wavelength to said Raman medium.

10. A Raman converter according to claim 1 wherein said reflection means selectively reflects laser radiation at said second wavelength and not at said first wavelength.

11. A Raman laser system comprising a Raman converter according to claim 1, and a pump laser for producing said laser radiation.

12. A Raman laser system according to claim 11 wherein said pump laser is a Neodymium:YAG laser.

13. A Raman converter according to claim 1, wherein said reflecting means is the only feedback element used.

14. A Raman converter according to claim 1, wherein said dichroic coupler is a mirror substantially reflecting at one of the said first and second wavelengths and substantially transmitting the other wavelength.

15. A method of converting the wavelength of laser radiation which comprises:

a. generating laser radiation at a first wavelength,
   b. directing said laser radiation via a dichroic coupler into a Raman medium, located external to said laser radiation sources,
   c. converting in said Raman medium, by stimulated Raman scattering, the energy of said laser radiation to Raman-shifted radiation at a second wavelength scattered substantially in the forward and backward directions relative to said laser beam,
   d. reflecting the forward scattered Raman-shifted radiation back into said Raman medium thereby enhancing the backward scattering of Raman-shifted radiation,
   e. coupling out, by said dichroic coupler, the backward scattered Raman-shifted radiation.

16. A method according to claim 15, where the said laser radiation directed to said Raman medium is focussed to a focal region therein, and where the reflected forward scattered Raman-shifted radiation is focused again to said focal region.

17. A method according to claim 16, where said focusing is performed by two lenses or lens system,, one at each side of the Raman Medium.

18. A method according to claim 15, where the Raman-shifted radiation is reflected by a retro-reflector, by a phase-conjugating reflector, or by a roof reflector.

19. A method according to claim 15, where the Raman Medium is a gas suitable for Raman scattering.

* * * * *